(12) United States Patent
Kaplan et al.

(10) Patent No.: US 7,733,418 B2
(45) Date of Patent: Jun. 8, 2010

(54) ENCAPSULATED SELF-BALANCING REMOTE VIDEO CAMERA SYSTEM

(76) Inventors: Alan Edward Kaplan, 9 Cromwell Dr., Morristown, NJ (US) 07960; Edward M. Ulicki, 52 Brookside Dr., Upper Saddle River, NJ (US) 07458; Nicholas C. Korinis, II, 432 76th St., North Bergen, NJ (US) 07047; Kenneth R. Jones, 12 Vandere Linde Rd., Wayne, NJ (US) 07470

( * ) Notice: Subject to any disclaimer, the term of this patent is extended or adjusted under 35 U.S.C. 154(b) by 669 days.

(21) Appl. No.: 11/731,940

(22) Filed: Apr. 2, 2007

(65) Prior Publication Data

US 2008/0239069 A1    Oct. 2, 2008

(51) Int. Cl.
*H04N 5/225* (2006.01)

(52) U.S. Cl. .......................... 348/373; 348/45; 348/65; 348/77; 348/144; 348/151

(58) Field of Classification Search .................. 348/45, 348/65, 144, 151, 373
See application file for complete search history.

(56) References Cited

U.S. PATENT DOCUMENTS

| | | | | |
|---|---|---|---|---|
| 4,278,077 A | * | 7/1981 | Mizumoto | .................. 600/109 |
| 7,577,283 B2 | * | 8/2009 | Zinaty et al. | ................. 382/128 |
| 7,604,589 B2 | * | 10/2009 | Glukhovsky et al. | ......... 600/117 |
| 7,604,591 B2 | * | 10/2009 | Uchiyama et al. | ............ 600/130 |
| 7,625,338 B2 | * | 12/2009 | Gilad et al. | .................. 600/173 |
| 7,634,305 B2 | * | 12/2009 | Davidson et al. | ............ 600/424 |
| 7,637,865 B2 | * | 12/2009 | Iddan et al. | .................. 600/130 |
| 7,647,090 B1 | * | 1/2010 | Frisch et al. | ................. 600/473 |
| 2009/0216079 A1 | * | 8/2009 | Morgan et al. | .............. 600/109 |

* cited by examiner

*Primary Examiner*—Tuan Ho
*Assistant Examiner*—Kent Wang
(74) *Attorney, Agent, or Firm*—Townsend & Banta

(57) ABSTRACT

An encapsulated self-balancing remote video camera system is provided, which is capable of righting itself into an upright, balanced position. The encapsulated self-balancing remote video camera system has a video camera, wireless communication means and balancing mass disposed within an internal, self-righting, inner structure. The inner structure is disposed within a transparent outer container, such that the inner structure may rotate within the outer container when resting upon a surface, such that the video camera rotates into an upright position by gravitational forces acting upon the balancing mass disposed with the inner structure. In addition, a remote operation means is provided, which enables a user of the present system to view video images transmitted from the video camera, and to remotely control movement of the lens and/or video camera.

20 Claims, 2 Drawing Sheets

ENCAPSULATED SELF-BALANCING REMOTE VIDEO CAMERA SYSTEM

FIELD OF THE INVENTION

An encapsulated self-balancing remote video camera system is provided, which is capable of righting an encapsulated video camera into an upright, balanced position. More particularly, an encapsulated self-balancing remote video camera system having an inner and outer container is provided, having a video camera and wireless communication means encapsulated within the internal, self-righting, bottom weighted inner container, such that the inner container may rotate within the outer container.

BACKGROUND OF THE INVENTION

Some conventional video camera systems, for use in surveillance, etc., are comprised of a bottom-weighted single sphere, that can be thrown into a structure for inspection thereof. The sphere has a camera mounted thereon, that is turned upright (into a position on the uppermost surface of the sphere when the sphere is resting on a surface) due to gravity. However, if the sphere comes to rest upon an uneven or soft surface, often the sphere fails to roll upright.

In order to overcome the disadvantages of the conventional video camera systems described above, it is an object of the present invention to provide an encapsulated self-balancing remote video camera system having an inner structure and outer container, capable of righting the inner structure into an upright, balanced position. Further, it is an object of the present invention to provide such a system wherein the video camera may be rotated.

SUMMARY OF THE INVENTION

In order to achieve the object of the present invention, as described above, the present inventors earnestly endeavored to provide an encapsulated self-balancing remote video camera system capable of transmitting a clear video image regardless of the surface upon which the system is resting. In particular, in a first embodiment of the present invention, an encapsulated self-balancing remote video camera system is provided, comprising:

(a) an inner structure, and a plurality of ports formed in said inner structure, at least a portion of the inner structure being comprised of a transparent material and/or having one or more perforations formed therein;

(b) one or more rotational adjustment means in communication with one or more ports formed in the inner structure;

(c) a video camera means disposed within the inner structure, said video camera means having a lens, preferably a wide angle lens, disposed adjacent a portion of the inner structure being comprised of a transparent material or having perforations formed therein;

(d) a first wireless communication means disposed within the inner structure, said wireless communication means in communication with the video camera means, and capable of wirelessly transmitting video images received from the video camera means;

(e) a balancing mass disposed in or formed contiguous with the inner structure, said balancing mass being disposed such that the balancing mass exerts a sufficient torque upon the inner structure to rotate same to a position wherein the lens is disposed upright; and (f) a hollow outer container having a diameter larger than a maximum span of the inner structure, the hollow outer container being formed of a transparent material, wherein the inner structure is freely rotatable within the hollow outer container, such that the balancing mass causes the video camera means wide angle lens to rotate into an upright position by gravitational forces acting upon the balancing mass.

In a second embodiment of the present invention, the encapsulated self-balancing remote video camera system of the first embodiment above is provided, wherein the inner structure is a container that is comprised of two or more disengagable portions, enabling the inner structure to be sealed, unsealed and/or dissassembled.

In a third embodiment of the present invention, the encapsulated self-balancing remote video camera system of the first embodiment above is provided, wherein the rotational adjustment means is comprised of races and/or bearings.

In a fourth embodiment of the present invention, the encapsulated self-balancing remote video camera system of the first embodiment is provided, wherein the rotational adjustment means comprises gimbal means, and wherein the inner structure rotates within the hollow outer container via the gimbal means.

In a fifth embodiment of the present invention, the encapsulated self-balancing remote video camera system of the first embodiment is provided, wherein the lens is a fisheye lens.

In a sixth embodiment of the present invention, the encapsulated self-balancing remote video camera system of the first embodiment is provided, wherein the balancing mass is disposed in the inner structure, such that the balancing mass causes the transparent and/or perforated portion of said inner structure to be disposed in an upright position when the encapsulated self-balancing video camera system rests on a surface.

In a seventh embodiment of the present invention, the encapsulated self-balancing remote video camera system of the first embodiment is provided, wherein the hollow outer container is comprised of two or more disengagable portions, enabling the hollow outer container to be sealed and unsealed.

In an eighth embodiment of the present invention, the encapsulated self-balancing remote video camera system of the first embodiment is provided, wherein the hollow outer container is comprised of a transparent polymer and/or plastic material.

In a ninth embodiment of the present invention, the encapsulated self-balancing remote video camera system of the first embodiment is provided, wherein the inner structure is a hollow container that is spherically shaped.

In a tenth embodiment of the present invention, the encapsulated self-balancing remote video camera system of the first embodiment is provided, wherein the inner structure is a hollow container that is oval shaped.

In an eleventh embodiment of the present invention, the encapsulated self-balancing remote video camera system of the first embodiment is provided, wherein the inner structure is a hollow container that is non-spherical in shape.

In a twelfth embodiment of the present invention, the encapsulated self-balancing remote video camera system of the first embodiment is provided, wherein the hollow outer container is spherically shaped.

In a thirteenth embodiment of the present invention, the encapsulated self-balancing remote video camera system of the first embodiment is provided, wherein the hollow outer container is oval shaped.

In a fourteenth embodiment of the present invention, the encapsulated self-balancing remote video camera system of the first embodiment is provided, wherein the hollow outer container is non-spherical in shape.

In a fifteenth embodiment of the present invention, the encapsulated self-balancing remote video camera system of the first embodiment is provided, further comprising a remote operation means, said remote operation means comprising:

a second wireless communication means capable of receiving video images transmitted from the first wireless communication means; and a video display means in communication with the second wireless communication means capable of displaying the video images transmitted from the first wireless communication means.

In a sixteenth embodiment of the present invention, the encapsulated self-balancing remote video camera system of the first embodiment is provided, wherein the camera is rotatable or tiltable and/or the lens is zoomable, and wherein the video camera means further comprises a video control means in communication with the lens, said video control means capable of controlling the movement of the camera and/or the zooming of the lens.

In a seventeenth embodiment of the present invention, the encapsulated self-balancing remote video camera system of the fifteenth and sixteenth embodiments is provided, wherein the remote operation means further comprises a remote video camera control means in communication with the video control means, said remote video camera control means capable of remotely controlling movement of the camera and lens by transmitting commands to the video control means via the first and second wireless communications means.

In an eigthteenth embodiment of the present invention, an encapsulated self-balancing remote video camera system is provided, comprising:

(a) an inner structure, and a plurality of ports formed in said inner structure, at least a portion of the inner structure being comprised of a transparent material and/or having one or more perforations formed therein;

(b) a video camera means disposed within the inner structure, said video camera means having a lens, preferably a wide angle lens, disposed adjacent a portion of the inner structure being comprised of a transparent material or adjacent one of the perforations formed therein;

(d) a first wireless communication means disposed within the inner structure, said wireless communication means in communication with the video camera means, and capable of wirelessly transmitting video images received from the video camera means;

(d) a balancing mass disposed in or formed contiguous with the inner structure, said balancing mass being disposed such that the balancing mass exerts a sufficient torque upon the inner structure to rotate same to a position wherein the lens is disposed upright;

(e) a hollow outer container having a diameter larger than a maximum diameter of the inner structure, the hollow outer container being formed of a transparent material; and (f) a friction reducing substance, such as a liquid, oil, etc., disposed between the inner structure and the hollow outer container, wherein the inner structure is freely rotatable within the hollow outer container via the friction reducing substance, such that the balancing mass causes the video camera means wide angle lens to rotate into an upright position by gravitational forces acting upon the balancing mass.

In a nineteenth embodiment, the encapsulated self-balancing remote video camera system of the first through nineteenth embodiments is provided, wherein the inner structure contains an inductive means for charging the batteries. This allows, but does not require, the inner structure to be permanently sealed.

In a twentieth embodiment of the present invention, the encapsulated self-balancing remote video camera system of the first through nineteenth embodiments is provided, wherein a "sleep" control turns off the camera and transmitter and motors (if any) contained in the inner structure, so as to save battery power until the camera, transmitter and/or motors are activated. This allows, for example, a unit (system) to be placed and not turned on until an area is occupied.

DETAILED DESCRIPTION OF THE INVENTION

Figure 1:
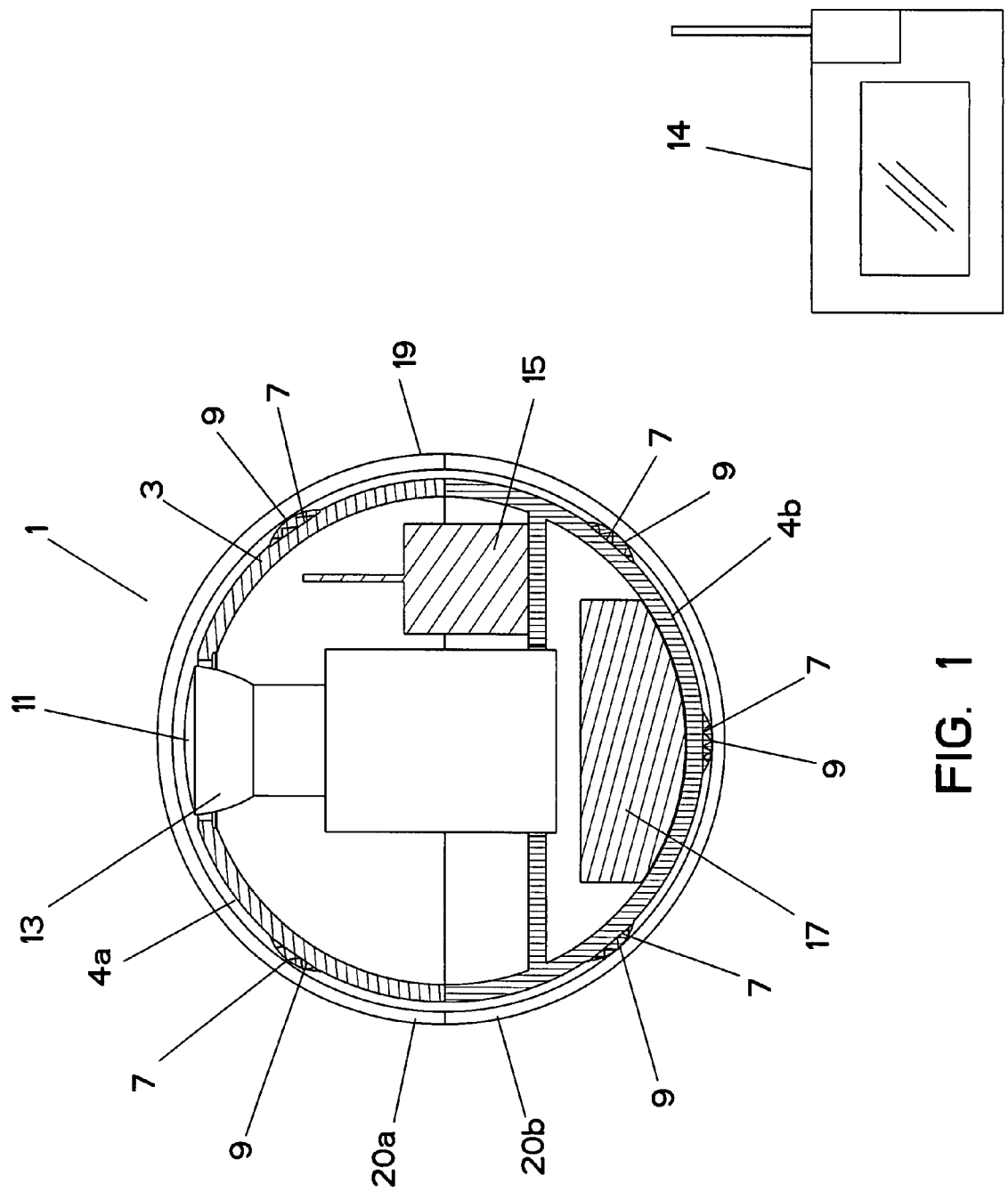
FIG. 1 is a cross sectional view of the encapsulated self-balancing remote video camera system of the first embodiment present invention.

As illustrated in FIG. 1, the encapsulated self-balancing remote video camera system 1 is comprised of an inner structure 3, a plurality of ports 7, 7 formed in said inner structure 3, and one or more rotational adjustment means 9, 9, 9, 9, 9, disposed within each of the ports 7, 7, 7, 7, 7. The rotational adjustment means 9,9, 9, 9, 9, are preferably races, or bearings (as illustrated in FIG. 1), but may be any means, such as a gimbal mechanism/means, which enable the inner structure 3 to roll against opposing surfaces and/or roll upright.

Alternatively, as provided in the eighteenth embodiment herein, the inner structure 3 may freely float/slide within the hollow outer container 19, with the assistance of a friction reducing substance, such as a liquid, oil, mercury, etc. In such an embodiment, the inner structure 3 may be sealed to prevent intrusion of the friction reducing substance therein (i.e., to prevent the friction reducing substance from damaging elements disposed within the internal structure), or the elements disposed within the internal structure may, themselves, be sealed to prevent intrusion therein by the friction reducing substance.

A portion of the inner structure 3 is comprised of a transparent material 11, such as a polymeric/plastic material. Alternatively, the inner structure 3 may be comprised of a transparent material and/or a non-transparent material, with one or more perforations formed therein. For example, the inner structure may resemble a cage, which may be formed of transparent or non-transparent material, such as a polymer, metal, etc.

A video camera means 13 is encapsulated within the inner structure 3. The video camera means 13 is comprised of a lens. Preferably, the lens is a wide angle lens, most preferably a fish eye lens. In order to have a clear line of sight/view, the lens is disposed adjacent the portion of the inner structure 3 comprised of a transparent material 11, or adjacent the portion of the inner structure 3 having a perforation therethrough.

Figure 2:
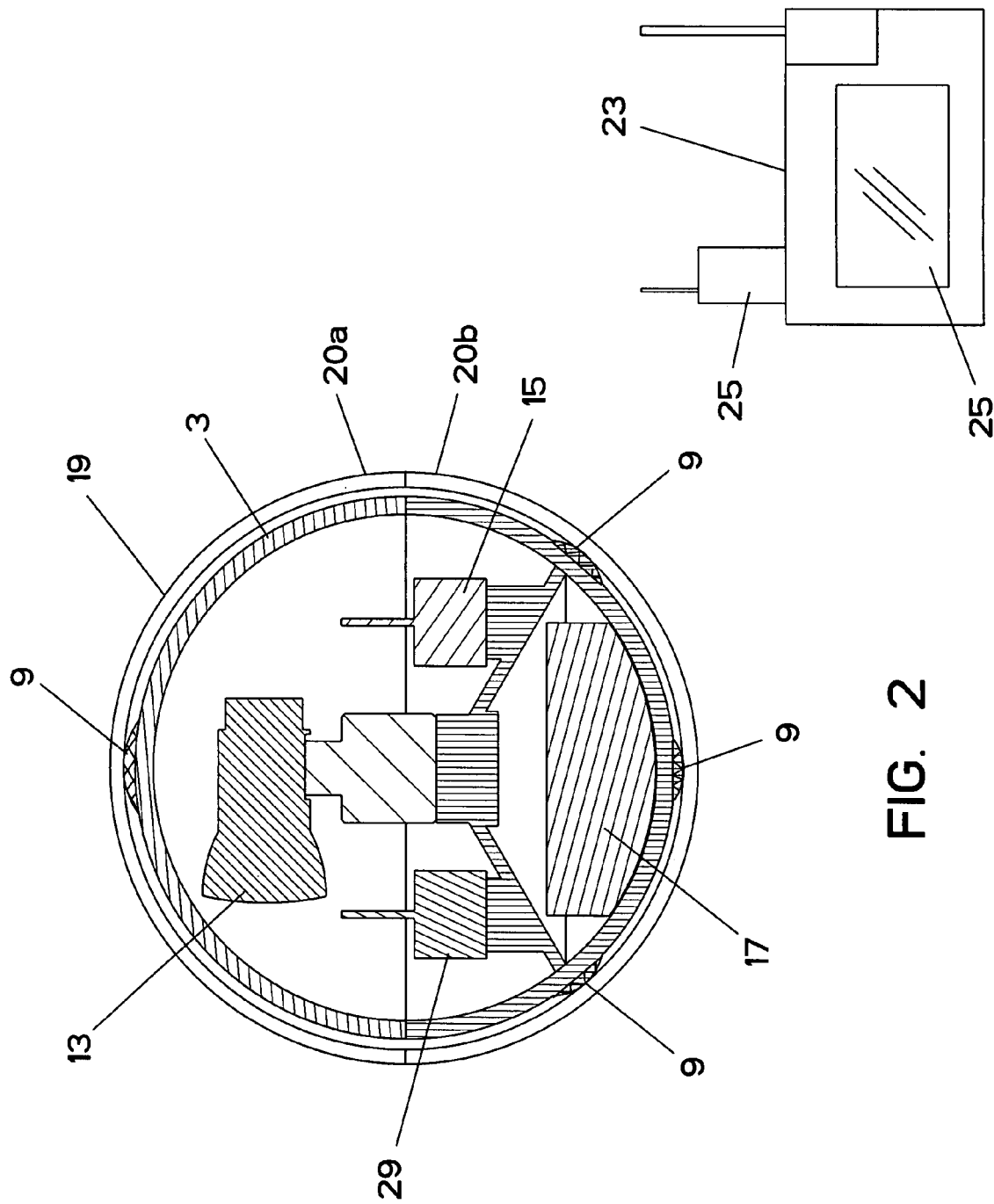
FIG. 2 is a cross sectional view of the encapsulated self-balancing remote video camera system of the first and sixteenth embodiments of the present invention.

As illustrated in FIG. 2, the camera may be movable. Further, the lens may be fixed, but may be zoomed. Accordingly, the video control means is provided in communication with the wide camera means 13. The video control means 14, consisting of, for example, wirelessly controlled electric actuators, is capable of controlling the movement of the lens. For example, the video control means 14 may be used to pan, tilt, an/or zoom the lens.

The inner structure 3 is preferably comprised of two or more disengagable portions 4a, 4b, enabling the inner structure 3 to be sealed and unsealed. It is important that the video camera means 13 be disposed adjacent the transparent material 11, or adjacent the portion of the inner structure having a perforation formed therein, such that the video camera may record imagery through the transparent material 11 or perforation.

In addition to the video camera means 13, a first wireless communication means 15 is disposed within the inner structure 3. The first wireless communication means 15 is in communication with the video camera means 13 and, if present, the video control means 14, via wired or wireless means, and is capable of wirelessly transmitting video images received from the video camera means 13 and receiving movement commands.

Further, a balancing mass 17 is disposed in or formed contiguous with the inner structurer 3. In particular, the balancing mass 17 is disposed such that the balancing mass 13 exerts a sufficient torque upon the inner structure 3 to rotate same to a position wherein the lens of the video camera means 13 is upright. The balancing mass 17 is disposed such that torque is sufficiently exerted on the video camera means 13 by the balancing mass 17 to rotate the lens into an upright position.

As further illustrated in FIGS. 1 and 2, a hollow outer container 19 is provided, the hollow outer container 19, made of a transparent material, having a circumference larger than a maximum span (diameter) of the inner structure 3, and comprised of two or more disengagable portions 20a, 20b (allowing the hollow outer container 19 to be sealed and unsealed). By disposing the inner structure 3, with rotational adjustment means 9, 9, 9, 9 disposed therein, within the hollow outer container 19, the inner structure is allowed to rotate within the hollow outer container 19 when acted upon by gravitational forces. In effect, the balancing mass 17 causes the video camera means 13 to rotate into an upright position, regardless of the surface upon which the hollow outer container 19 rests.

As illustrated in FIG. 2, and as called for in the fifteenth embodiment herein, the encapsulated self-balancing remote video camera system 1 of the present invention may further comprise a remote operation means 23 which enables a user of the present system to view video images transmitted by the first wireless communication means 15, and to remotely control movement of the lens. In particular, the remote operation means 23 comprises a second wireless communication 25 means capable of receiving video images transmitted from the first wireless communication means 15, and a video display means 27 in communication with the second wireless communication means 25 capable of displaying the video images transmitted from the first wireless communication means 15.

In the event that the camera is movable, the remote operation means 23 further preferably comprises a remote video camera control means 29 in wireless communication with the video control means, said remote video camera control means enabling a user to remotely control movement of the camera by transmitting commands to the video control means via the first and second wireless communications means. For example, the remote video camera control means 29 may be used to zoom the lens, and/or pan and/or tilt the camera.

Although specific embodiments of the present invention have been disclosed herein, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. An encapsulated self-balancing remote video camera system is provided, comprising:
   (a) an inner structure, and a plurality of ports formed in said inner structure, at least a portion of the inner structure being comprised of a transparent material and/or having one or more perforations formed therein;
   (b) one or more rotational adjustment means in communication with one or more ports formed in the inner structure;
   (c) a video camera means disposed within the inner structure, said video camera means having a lens, preferably a wide angle lens, disposed adjacent a portion of the inner structure being comprised of a transparent material or having perforations formed therein;
   (d) a first wireless communication means disposed within the inner structure, said wireless communication means in communication with the video camera means, and capable of wirelessly transmitting video images received from the video camera means;
   (e) a balancing mass disposed in or formed contiguous with the inner structure, said balancing mass being disposed such that the balancing mass exerts a sufficient torque upon the inner structure to rotate same to a position wherein the lens is disposed upright; and
   (f) a hollow outer container having a diameter larger than a maximum span of the inner structure, the hollow outer container being formed of a transparent material,
   wherein the inner structure is freely rotatable within the hollow outer container, such that the balancing mass causes the video camera means wide angle lens to rotate into an upright position by gravitational forces acting upon the balancing mass.

2. The encapsulated self-balancing remote video camera system of claim 1, wherein the inner structure is a container that is comprised of two or more disengagable portions, enabling the inner structure to be sealed, unsealed and/or dissassembled.

3. The encapsulated self-balancing remote video camera system of claim 1, wherein the rotational adjustment means is comprised of races and/or bearings.

4. The encapsulated self-balancing remote video camera system of claim 1, wherein the rotational adjustment means comprises gimbal means, and wherein the inner structure rotates within the hollow outer container via the gimbal means.

5. The encapsulated self-balancing remote video camera system of claim 1, wherein the lens is a fisheye lens.

6. The encapsulated self-balancing remote video camera system of claim 1, wherein the balancing mass is disposed in the inner structure, such that the balancing mass causes the transparent and/or perforated portion of said inner structure to be disposed in an upright position when the encapsulated self-balancing video camera system rests on a surface.

7. The encapsulated self-balancing remote video camera system of claim 1, wherein the hollow outer container is comprised of two or more disengagable portions, enabling the hollow outer container to be sealed and unsealed.

8. The encapsulated self-balancing remote video camera system of claim 1, wherein the hollow outer container is comprised of a transparent polymer and/or plastic material.

9. The encapsulated self-balancing remote video camera system of claim 1, wherein the inner structure is a hollow container that is spherically shaped.

10. The encapsulated self-balancing remote video camera system of claim 1, wherein the inner structure is a hollow container that is oval shaped.

11. The encapsulated self-balancing remote video camera system of claim 1, wherein the inner structure is a hollow container that is non-spherical in shape.

12. The encapsulated self-balancing remote video camera system of claim 1, wherein the hollow outer container is spherically shaped.

13. The encapsulated self-balancing remote video camera system of claim 1, wherein the hollow outer container is oval shaped.

14. The encapsulated self-balancing remote video camera system of claim 1, wherein the hollow outer container is non-spherical in shape.

15. The encapsulated self-balancing remote video camera system of claim 1, further comprising a remote operation means, said remote operation means comprising:
   a second wireless communication means capable of receiving video images transmitted from the first wireless communication means; and
   a video display means in communication with the second wireless communication means capable of displaying the video images transmitted from the first wireless communication means.

16. The encapsulated self-balancing remote video camera system of claim 15, wherein the remote operation means further comprises a remote video camera control means in communication with the video control means, said remote video camera control means capable of remotely controlling movement of the camera and lens by transmitting commands to the video control means via the first and second wireless communications means.

17. The encapsulated self-balancing remote video camera system of claim 1, wherein the camera is rotatable or tiltable and/or the lens is zoomable, and wherein the video camera means further comprises a video control means in communication with the lens, said video control means capable of controlling the movement of the camera and/or the zooming of the lens.

18. The encapsulated self-balancing remote video camera system of claim 1, wherein the inner structure contains an inductive means for charging the batteries.

19. The encapsulated self-balancing remote video camera system of claim 1, wherein a "sleep" control turns off the camera and transmitter and motors disposed in the inner structure, so as to save battery power until the camera, transmitter and/or motors are activated.

20. An encapsulated self-balancing remote video camera system, comprising:
   (a) an inner structure, and a plurality of ports formed in said inner structure, at least a portion of the inner structure being comprised of a transparent material and/or having one or more perforations formed therein;
   (b) a video camera means disposed within the inner structure, said video camera means having a lens, preferably a wide angle lens, disposed adjacent a portion of the inner structure being comprised of a transparent material or adjacent one of the perforations formed therein;
   (d) a first wireless communication means disposed within the inner structure, said wireless communication means in communication with the video camera means, and capable of wirelessly transmitting video images received from the video camera means;
   (d) a balancing mass disposed in or formed contiguous with the inner structure, said balancing mass being disposed such that the balancing mass exerts a sufficient torque upon the inner structure to rotate same to a position wherein the lens is disposed upright;
   (e) a hollow outer container having a diameter larger than a maximum diameter of the inner structure, the hollow outer container being formed of a transparent material; and
   (f) a friction reducing substance, such as a liquid, oil, etc., disposed between the inner structure and the hollow outer container,
   wherein the inner structure is freely rotatable within the hollow outer container via the friction reducing substance, such that the balancing mass causes the video camera means wide angle lens to rotate into an upright position by gravitational forces acting upon the balancing mass.

* * * * *